United States Patent
Izumikawa et al.

(10) Patent No.: US 10,497,184 B2
(45) Date of Patent: Dec. 3, 2019

(54) SHOVEL

(71) Applicant: SUMITOMO(S.H.I.) CONSTRUCTION MACHINERY CO., LTD., Tokyo (JP)

(72) Inventors: Takeya Izumikawa, Chiba (JP); Nobuyuki Ishii, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/993,213

(22) Filed: Jan. 12, 2016

(65) Prior Publication Data
US 2016/0125666 A1 May 5, 2016

Related U.S. Application Data

(63) Continuation of application No. PCT/JP2014/068129, filed on Jul. 8, 2014.

(30) Foreign Application Priority Data

Jul. 17, 2013 (JP) .................................. 2013-148883

(51) Int. Cl.
*B60K 35/00* (2006.01)
*F01N 3/20* (2006.01)
(Continued)

(52) U.S. Cl.
CPC .............. *G07C 5/004* (2013.01); *B60K 35/00* (2013.01); *E02F 3/34* (2013.01); *E02F 9/261* (2013.01);
(Continued)

(58) Field of Classification Search
CPC .. B60K 35/00; E02F 3/34; E02F 9/261; E02F 9/267; F01N 11/00; F01N 3/00;
(Continued)

(56) References Cited

U.S. PATENT DOCUMENTS

2002/0015018 A1   2/2002 Shimazu et al.
2007/0006101 A1*  1/2007 Michaels ................. B63J 99/00
                                                                    715/866
(Continued)

FOREIGN PATENT DOCUMENTS

EP   1662054   5/2006
EP   2573345   3/2013
(Continued)

OTHER PUBLICATIONS

Machine translation JP 2009-121256 Done Sep. 17, 2016.*
International Search Report dated Oct. 28, 2014.

*Primary Examiner* — Patrick D Maines
*Assistant Examiner* — Dapinder Singh
(74) *Attorney, Agent, or Firm* — IPUSA, PLLC (57) ABSTRACT

A shovel includes a lower traveling body; an upper turning body that is installed on the lower traveling body; an internal-combustion engine disposed in the upper turning body; an oil hydraulic pump that discharges hydraulic oil by power of the internal-combustion engine; a hydraulic actuator that is driven by the hydraulic oil discharged by the oil hydraulic pump; a fuel container that stores fuel of the internal-combustion engine; a first detector that detects a residual quantity state of the fuel; a reducing agent container that stores a reducing agent to be used in a selective catalytic reduction system; a second detector that detects a residual quantity state of the reducing agent; and an image display unit that is installed in a cabin, wherein the image display unit is configured to simultaneously image-display the residual quantity state of the fuel and the residual quantity state of the reducing agent.

13 Claims, 8 Drawing Sheets (51) Int. Cl.
*F01N 11/00* (2006.01)
*G07C 5/00* (2006.01)
*E02F 9/26* (2006.01)
*E02F 3/34* (2006.01)
*F15B 11/08* (2006.01)

(52) U.S. Cl.
CPC ............ *E02F 9/267* (2013.01); *F01N 3/2066* (2013.01); *F01N 11/00* (2013.01); *F15B 11/08* (2013.01); *B60K 2370/168* (2019.05); *B60K 2370/178* (2019.05); *F01N 2590/08* (2013.01); *F01N 2900/1814* (2013.01); *Y02A 50/2325* (2018.01); *Y02T 10/24* (2013.01); *Y02T 10/47* (2013.01)

(58) Field of Classification Search
CPC ......... F01N 2590/08; F01N 2900/1814; F01N 3/2066; G07C 5/004; F15B 11/08; Y02T 10/24; Y02T 10/47
USPC ........ 60/286, 295, 301; 180/296, 68.3, 65.1, 180/65.4, 65.31, 68.1, 307; 701/21, 51, 701/182, 482
See application file for complete search history.

(56) References Cited

U.S. PATENT DOCUMENTS

| | | |
|---|---|---|
| 2007/0168101 A1 | 7/2007 | Shibamori et al. |
| 2012/0245760 A1 | 9/2012 | Ikeya |
| 2013/0006495 A1* | 1/2013 | Tajima ................ F02D 41/027 701/102 |
| 2013/0055700 A1* | 3/2013 | Minezawa ............ F01N 3/208 60/277 |
| 2013/0071295 A1 | 3/2013 | Terakawa et al. |
| 2013/0110348 A1 | 5/2013 | Jinbo et al. |
| 2013/0169690 A1 | 7/2013 | Gotou et al. |
| 2014/0267731 A1 | 9/2014 | Izumikawa |
| 2015/0310678 A1 | 10/2015 | Ito |

FOREIGN PATENT DOCUMENTS

| | | |
|---|---|---|
| JP | 2004-308137 | 11/2004 |
| JP | 2005-248646 | 9/2005 |
| JP | 2007-331602 | 12/2007 |
| JP | 2008-127997 | 6/2008 |
| JP | 2009-121256 | 6/2009 |
| JP | 2009-127521 | 6/2009 |
| JP | 2010-261373 | 11/2010 |
| JP | 2011-196117 | 10/2011 |
| JP | 2011-231489 | 11/2011 |
| JP | 2011-247232 | 12/2011 |
| JP | 2012-013452 | 1/2012 |
| JP | 2012-062707 | 3/2012 |
| JP | 2012-122386 | 6/2012 |
| JP | 2013-124467 | 6/2013 |
| WO | 2005/103397 | 11/2005 |
| WO | 2009/001195 | 12/2008 |
| WO | 2011/115089 | 9/2011 |
| WO | 2015/040762 | 3/2015 |

* cited by examiner

SHOVEL

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2014/068129 filed on Jul. 8, 2014, designating the U.S., which claims priority based on Japanese Patent Application No. 2013-148883 filed on Jul. 17, 2013. The entire contents of each of the foregoing applications are incorporated herein by reference.

BACKGROUND

Technical Field

The present invention relates to a shovel in which a NOx catalytic reduction system is installed.

Description of Related Art

A urea water level measurement device has been known, which is for visualizing a level of urea water that is stored in a urea water tank. Note that urea water is an example of a reducing agent that is to be used in a selective catalytic reduction (SCR) system, which may be used as a NOx catalytic reduction system.

This urea water level measurement device includes a display unit for displaying, at a position where the display unit is visible by an operator who performs a supply task in the vicinity of a supply port of the urea water tank, a level of urea water. Additionally, the display unit has a brightness level with which the display unit is visible by an operator even in a dark place.

There is a need for a shovel for which a driver can easily confirm a level of a reducing agent.

SUMMARY

According to an aspect of the present invention, there is provided a shovel that performs works upon being operated by a driver, the shovel including a lower traveling body; an upper turning body that is installed on the lower traveling body; an internal-combustion engine that is disposed in the upper turning body; an oil hydraulic pump that discharges hydraulic oil by power of the internal-combustion engine; a hydraulic actuator that is driven by the hydraulic oil that is discharged by the oil hydraulic pump; a fuel container that stores fuel of the internal-combustion engine; a first detector that detects a residual quantity state of the fuel in the fuel container; a reducing agent container that stores a reducing agent that is used in a selective catalytic reduction system; a second detector that detects a residual quantity state of the reducing agent in the reducing agent container; and an image display unit that is installed in a cabin, wherein the image display unit is configured to simultaneously image-display the residual quantity state of the fuel and the residual quantity state of the reducing agent.

Other objects, features and advantages of the present invention will become more apparent from the following detailed description when read in conjunction with the accompanied drawings.

DETAILED DESCRIPTION

A urea water level measurement display device may be installed in the vicinity of the supply port of the urea water tank. Consequently, a driver of a vehicle who attempts to confirm a level of urea water may be required to get out of a driver's seat to open a lid that is provided in a body of the vehicle, so as to expose the urea water level measurement display device.

In a shovel that includes an upper turning body that is disposed on a lower traveling body, an installation position of a urea water tank that is installed in the upper turning body is at a relatively high position from the ground. Further, in many cases, a cover that covers the urea water tank is made relatively strong and made robust against a theft, etc. Thus, for a case where such a urea water level measurement display device is installed in a shovel, in order to confirm a level of the urea water, a driver of the shovel may climb up to an installation position of a urea water tank, and may perform a task of opening a strong and robust cover. Here, upon detecting that the urea water is running short, the work by the shovel may be required to be interrupted. Thus, a driver may be required to repeat this complicated confirmation task, regardless of an environment where scaffold may be poor. Especially, a driver may be required to prepare supplementary urea water, in advance, at a construction site because a shovel may not be driven on an ordinary road. Furthermore, works with a shovel are often performed at a remote area, such as a mountainous area, so that it takes time and effort to supplement urea water. Thus, it is desirable to manage urea water so as to maintain work efficiency.

Figure 1:
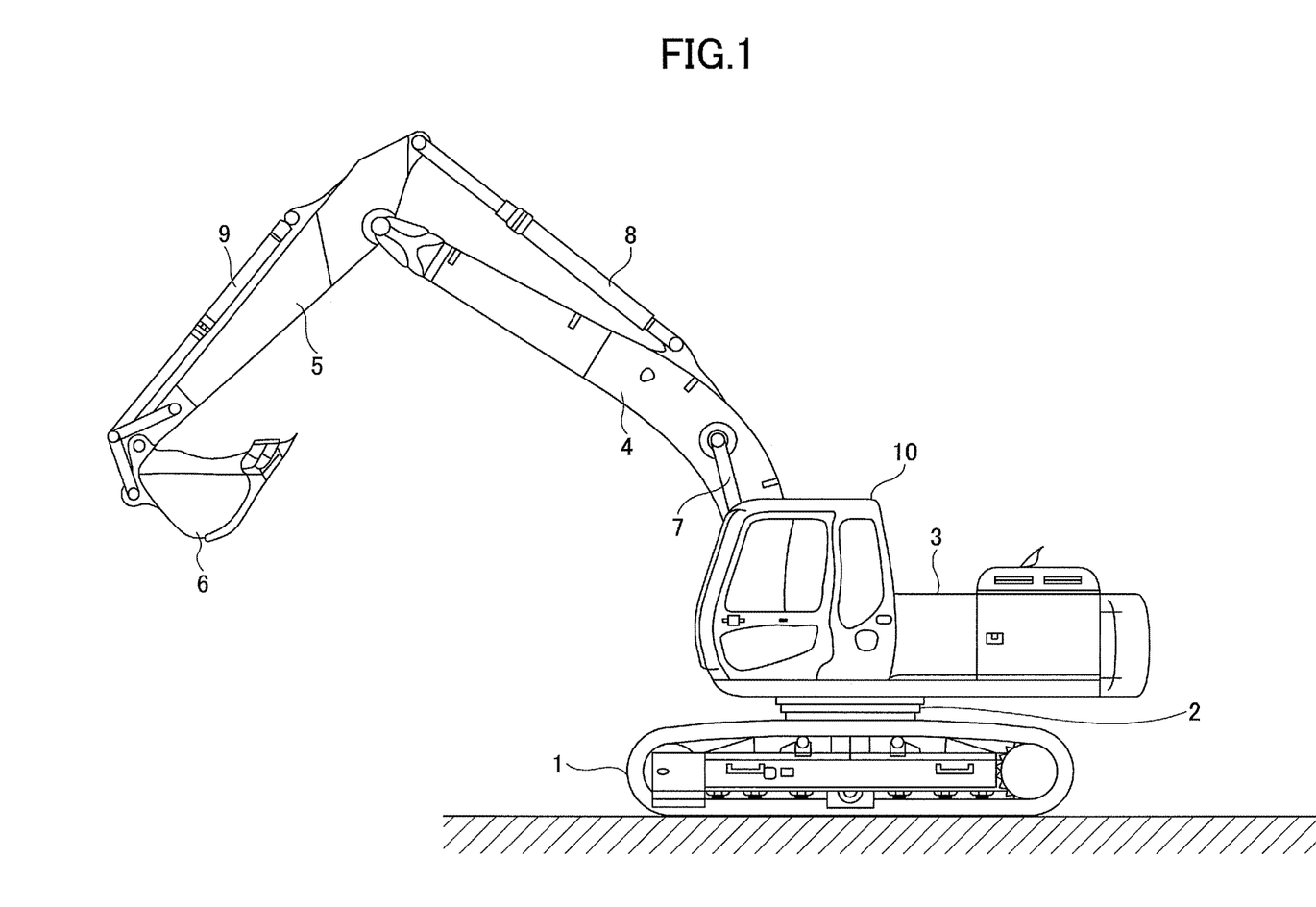
FIG. 1 is a side view of a shovel to which an embodiment of the present invention is applied.

FIG. 1 is a side view of a shovel to which an embodiment of the present invention is applied. An upper turning body 3 can be installed on a lower traveling body 1 of the shovel through a turning mechanism 2. A hinged boom 4 can be attached to the upper turning body 3. Additionally, an arm 5 can be attached to a tip of the hinged boom 4, and a bucket 6 can be attached to a tip of the arm 5. The hinged boom 4, the arm 5, and the bucket 6 can be hydraulically driven by a hinged boom cylinder 7, an arm cylinder 8, and a bucket cylinder 9, respectively. A cabin 10 can be provided in the upper turning body 3, and a power source, such as an engine 11 that may be an internal-combustion engine, can be installed in the upper turning body 3. A driver's seat can be provided in the cabin 10, and a driver can operate the shovel while sitting on the driver's seat.

Figure 2:
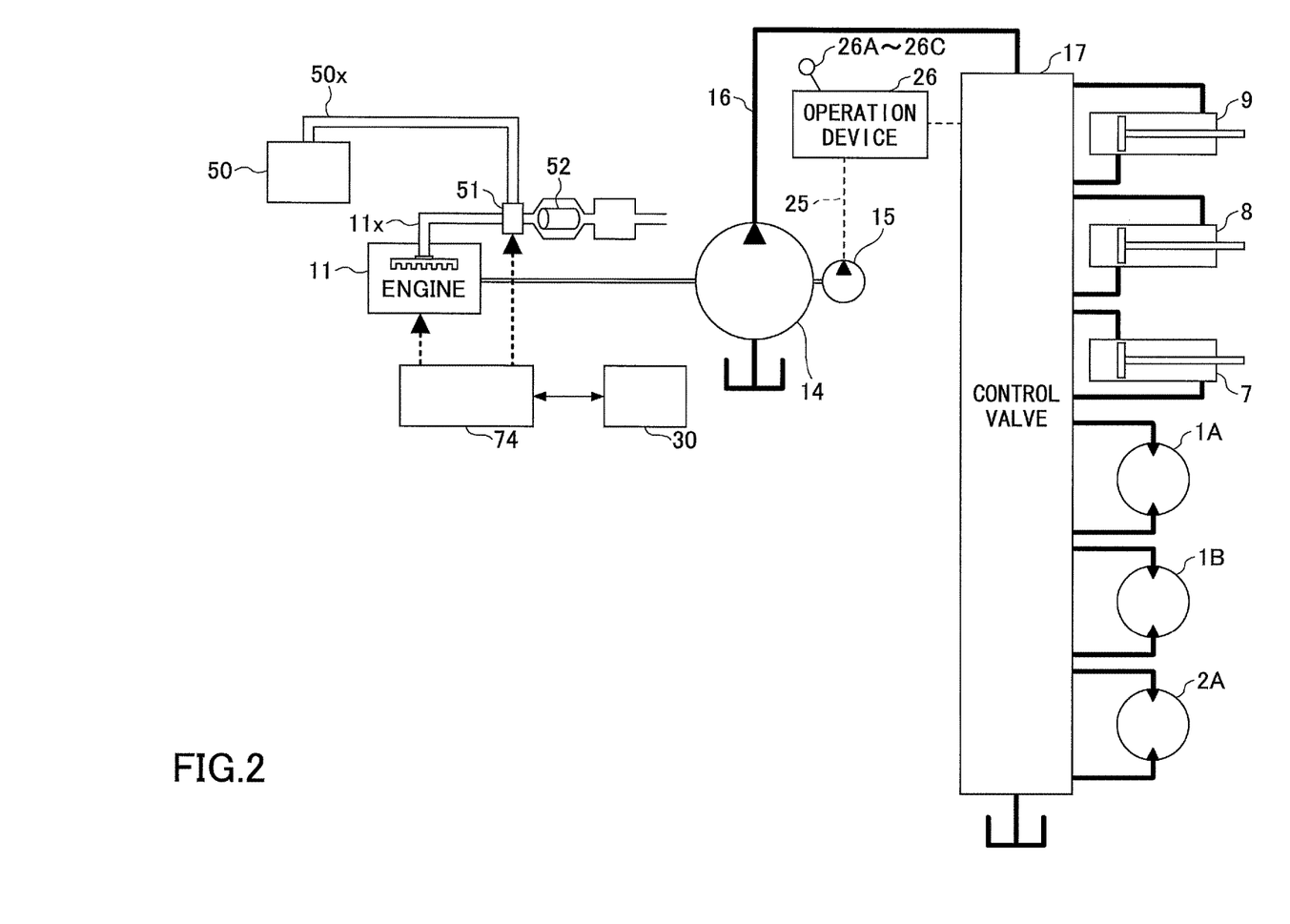
FIG. 2 is a block diagram showing a configuration example of a drive system of the shovel that is shown in FIG. 1.

FIG. 2 is a block diagram showing a configuration example of a drive system of the shovel that is shown in FIG.

1. In FIG. 2, a mechanical power system is indicated by a double line, a high-pressure hydraulic line is indicated by a thick solid line, a pilot line is indicated by a broken line, and an electric control system is indicated by a thin solid line, respectively.

The drive system of the shovel may be mainly formed of the engine 11; a main pump 14; a pilot pump 15; a control valve 17; an operating device 26; a controller 30; and an engine control unit (ECU) 74.

The engine 11 is a driving source of the shovel, and the engine 11 can be, for example, a diesel engine that can operate to maintain a predetermined number of revolutions. An output shaft of the engine 11 can be connected to an input shaft of the main pump 14, and to an input shaft of the pilot pump 15.

An exhaust gas from the engine 11 can be emitted, to the atmosphere, through an NOx reduction catalyst 52 that is provided in an exhaust pipe 11x. Further, the exhaust pipe 11x can be connected to a urea water tank 50 through a urea water injector 51 and a urea water supply pipe 50x. With this configuration, urea water that is stored in the urea water tank 50 can be pumped up by a urea water supply pump of the urea water injector 51. Then, the urea water can be injected into the exhaust gas from the engine 11 at upstream of the NOx reduction catalyst 52, thereby accelerating a reduction reaction of NOx.

The main pump 14 can be an oil hydraulic pump that can supply a hydraulic oil to the control valve 17 through a high-pressure hydraulic line 16, and the main pump 14 can be a swash plate type variable displacement hydraulic pump, for example. The pilot pump 15 can be an oil hydraulic pump that can supply a hydraulic oil to various types of hydraulic controllers through a pilot line 25, and the pilot pump 15 can be a fixed displacement type hydraulic pump, for example.

The control valve 17 can be a hydraulic control valve for controlling a hydraulic system in the shovel. The control valve 17 can selectively supply a hydraulic oil that is supplied from the main pump 14 to one or more of the hinged boom cylinder 7; the arm cylinder 8; the bucket cylinder 9; a traveling hydraulic motor 1A (for right); a traveling hydraulic motor 1B (for left); and a turning hydraulic motor 2A, for example. Note that, in the following description, the hinged boom cylinder 7, the arm cylinder 8, the bucket cylinder 9, the traveling hydraulic motor 1A (for right), the traveling hydraulic motor 1B (for left), and the turning hydraulic motor 2A may be collectively referred to as "a hydraulic actuator."

The operating device 26 can be a device that is used by an operator to operate the hydraulic actuator. The operating device 26 can supply, through the pilot line 25, the hydraulic oil that is supplied from the pilot pump 15 to pilot ports of flow control valves that correspond to the hydraulic actuators. Note that, a pressure of the hydraulic oil that can be supplied to each one of the pilot ports can be a pressure that depends on an operation direction and an operation amount of a lever or pedals 26A-26C, which correspond to the hydraulic actuators.

The controller 30 can be a control device for controlling the shovel, and the controller 30 can be formed of, for example, a computer including a CPU, a RAM, a RUM, and so forth. The CPU of the controller 30 can read out programs corresponding to an operation and a function of the shovel from the ROM, and the CPU of the controller 30 can load the programs into the RAM. Then, the CPU can achieve the operation and the function of the shovel that correspond to these programs by executing these programs.

The engine control unit (ECU) 74 can be a device for controlling the engine 11. In the embodiment, the ECU 74 can collect various types of data that indicate a condition of the engine 11, and the ECU 74 can transmit the collected data to the controller 30. Additionally, the ECU 74 can determine an injection amount of urea water depending on the collected data. Then, the ECU 74 can transmit a control signal to the urea water injector 51 to control the injection amount of the urea water with respect to the exhaust gas from the engine 11. Note that, in FIG. 2, the ECU 74 and the controller 30 are configured separately; however, the ECU 74 and the controller 30 may be configured integrally. For example, the ECU 74 may be integrated into the controller 30.

In the shovel that can be configured as described above, an image display device can be disposed in the vicinity of a driver's seat so as to assist driving of the shovel by an operator. The operator can input information and a command to the controller 30 of the shovel by using an input unit of the image display device. Additionally, the image display device can provide information to a driver by displaying a driving condition and control information of the shovel on an image display unit of the image display device.

Figure 3:
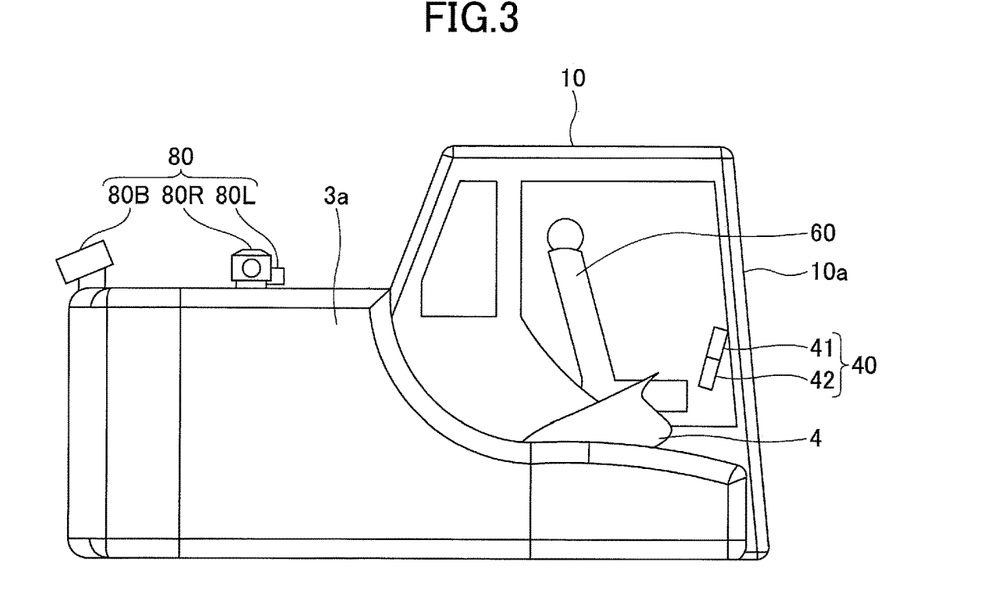
FIG. 3 is a side view showing an inner side of a cabin in which an image display device is installed.
Figure 4:
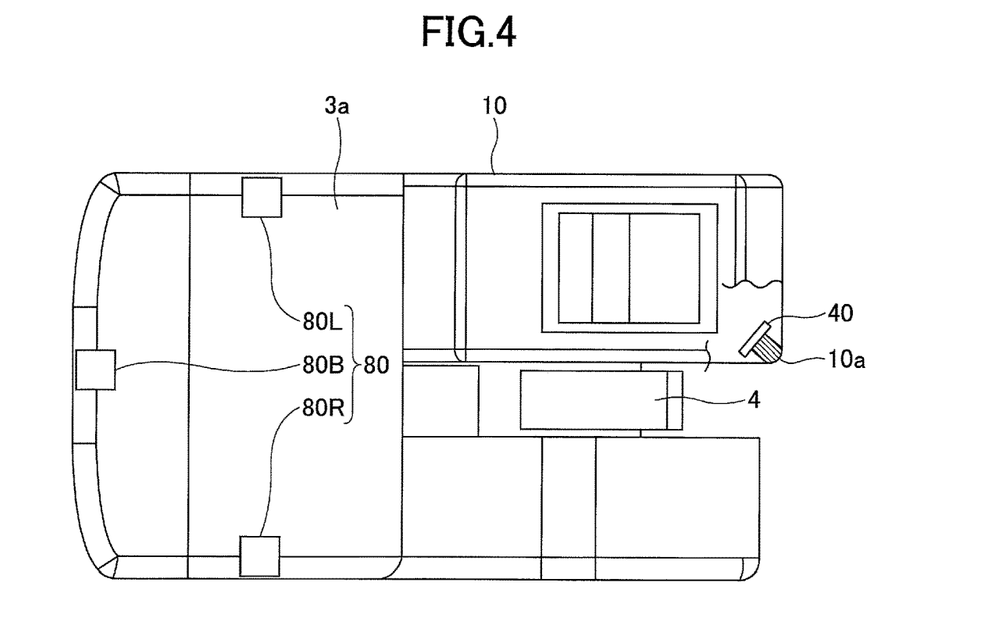
FIG. 4 is a plan view of the cabin in which the image display device is installed.

FIG. 3 is a side view showing an inner part of a cabin in which the image display device is installed, and FIG. 4 is a plan view thereof.

The image display device 40 may include an image display unit 41; and an input unit 42. Further, the image display device 40 can be fixed to a frame (a pillar) 10a of the cabin 10, which can be provided with the driver's seat 60.

Note that, in general, the hinged boom 4 can often be disposed at a right side when it is viewed from a driver sitting on the driver's seat 60, and the driver may drive the shovel while viewing the arm 5 and the bucket 6 that are attached to the tip of the hinged boom 4. The frame 10a in a front right side of the cabin 10 can be a portion that may be an obstacle to the driver's view; however, in the embodiment, the image display device 40 can be provided by exploiting this portion. In this manner, the image display device 40 may not significantly obstruct the driver's view because the image display device 40 can be disposed at the portion that may originally be the obstacle to the driver's view. Though it depends on the width of the frame 10a, in the image display device 40, the image display unit 41 can be formed to be vertically elongated, so that the whole image display device 40 can be accommodated in the width of the frame 10a.

Here, FIGS. 3 and 4 show a state where an image capturing device 80 is installed on a cover 3a that can cover the engine 11; the urea water tank 50, and so forth that may be disposed in the upper turning body 3. Additionally, FIGS. 3 and 4 show that the image capturing device 80 may be formed of a left side monitoring camera 80L; a rear monitoring camera 80B; and a right side monitoring camera 80R.

Figure 5:
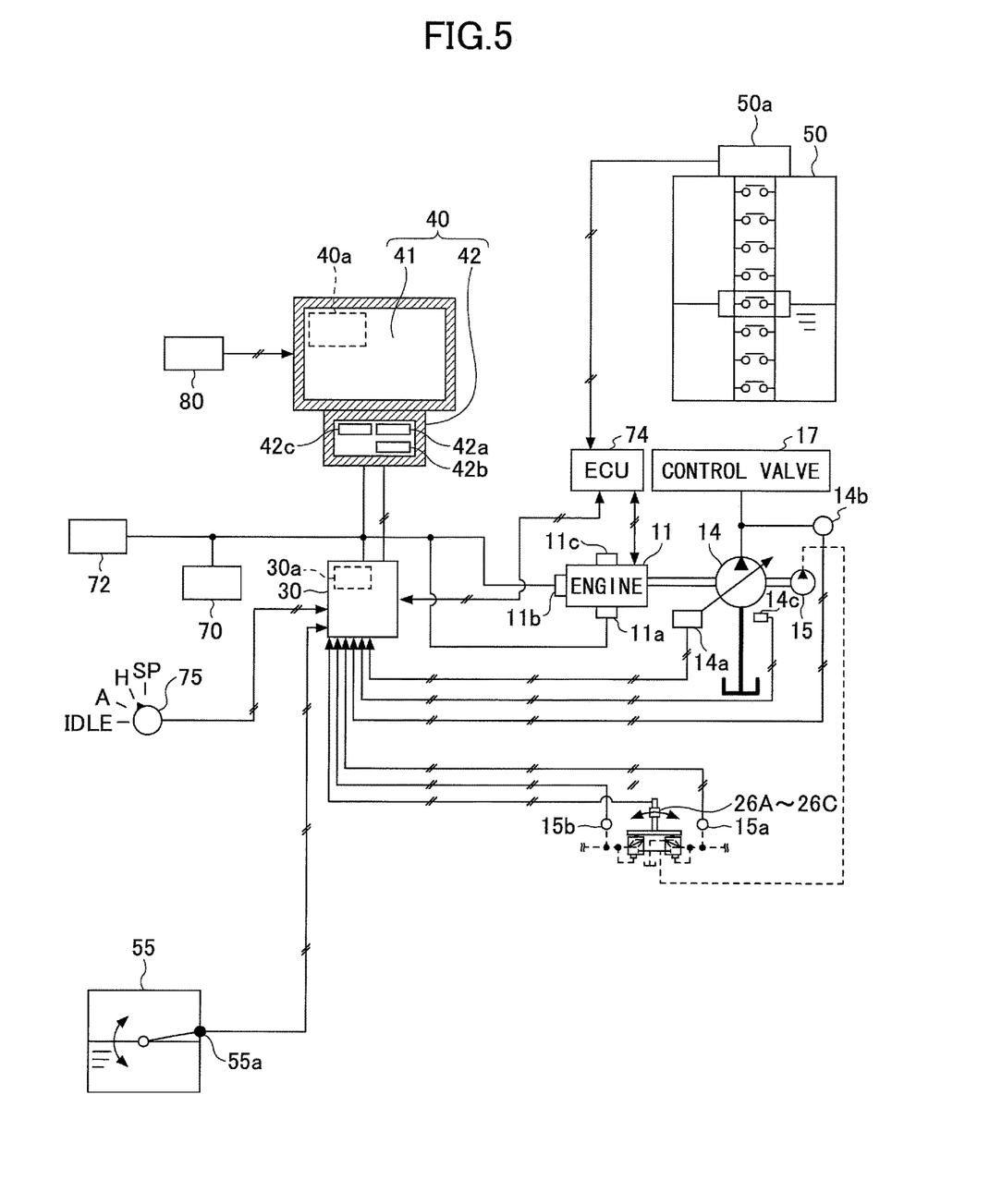
FIG. 5 is a block diagram showing an example of a connection between a controller and the image display device of the shovel.

FIG. 5 is a block diagram showing an example of connection between the controller 30 of the shovel and the image display device 40. In the embodiment, the image display device 40 can be connected to the controller 30 through a communication network, such as a Controller Area Network (CAN), and a Local Interconnect Network (LIN). Note that the image display device 40 may be connected to the controller 30 through a dedicated line.

Further, the image display device 40 may include a conversion processing unit 40a that can generate an image that is to be displayed on the image display unit 41. In the embodiment, the conversion processing unit 40a can generate a camera image that is to be displayed on the image display unit 41 based on an output of the image capturing device 80. For this reason, the image capturing device 80 can be connected to the image display device 40 through a dedicated line, for example.

Further, the conversion processing unit 40*a* can convert, among data items that may be input to the image display device 40, data that is to be displayed on the image display unit 41 into an image signal. Note that the data items that may be input to the image display device 40 may include image data that may be output from each of the left side monitoring camera 80L, the rear monitoring camera 80B, and the right side monitoring camera 80R, for example.

Additionally, the conversion processing unit 40*a* can generate an image that is to be displayed on the image display unit 41 based on an output from the controller 30. In the embodiment, the conversion processing unit 40*a* can convert, among data items that may be input to the controller 30, data that is to be displayed on the image display unit 41 into an image signal. Note that the data items that may be input to the controller 30 may include, for example, data indicating a temperature of cooling water of the engine, data indicating a temperature of the hydraulic oil, data indicating a residual amount of urea water, data indicating a residual amount of fuel, and so forth.

Then, the conversion processing unit 40*a* can output a converted image signal to the image display unit 41, and the conversion processing unit 40*a* can cause the corresponding image to be displayed on the image display unit 41.

Note that the conversion processing unit 40*a* may be implemented as a function that is included in the controller 30, instead of a function that is included in the image display device 40. In this case, the image capturing device 80 may be connected to the controller 30, instead of the image display device 40.

Further, the image display device 40 may include a switch panel 42, as the input unit 42. The switch panel 42 may be a panel that includes various types of hardware switches. In the embodiment, the switch panel 42 may include a light switch 42; a wiper switch 42*b*; and a window washer switch 42*c*, as hardware buttons. The light switch 42*a* can be a switch for switching between turning on and turning off of a light that can be attached to the outside of the cabin 10. The wiper switch 42*b* can be a switch for switching between activation and deactivation of a wiper. Further, the window washer switch 42*c* can be a switch for discharging a window washer liquid.

Further, the image display device 40 can operate by receiving supply of electric power from a storage battery 70. Here, the storage battery 70 can be charged by electric power that is generated by an alternator 11*a* (a generator) of the engine 11. The electric power of the storage battery 70 can also be supplied to an electrical component 72 and so forth of the shovel, other than the controller 30 and the image display device 40. Additionally, a starter 11*b* of the engine 11 can be driven by the electric power from the storage battery 70 to start the engine 11.

The engine 11 can be controlled by the engine control unit (ECU) 74. From the ECU 74, various types of data indicating a condition of the engine 11 (e.g., data indicating a temperature of cooling water (a physical quantity) that may be detected by a water temperature sensor 11*c*) can always be transmitted to the controller 30. Thus, the controller 30 may accumulate the data in a temporary storage unit (a memory) 30*a*, and the controller 30 may transmit the data to the image display device 40, as required.

Further, various types of data can be supplied to the controller 30 in the following manner, and the various types of data can be stored in the temporary storage unit 30*a* of the controller 30.

First, data that indicates a swash plate angle can be supplied, to the controller 30, from a regulator 14*a* of the main pump 14, which can be a variable displacement hydraulic pump. Additionally, data indicating discharge pressure of the main pump 14 can be transmitted from a discharge pressure sensor 14*b* to the controller 30. These data items (the data indicating a physical quantity) can be stored in the temporary storage unit 30*a*. Further, an oil temperature sensor 14*c* may be provided in a pipeline between the tank that stores the hydraulic oil that is to be suctioned by the main pump 14 and the main pump 14. Thus, data representing the temperature of the hydraulic oil that flows in the pipeline can be supplied from the oil temperature sensor 14*c* to the controller 30.

Further, data indicating a stored amount of a reducing agent can be supplied from a reducing agent stored amount detector 50*a* of a reducing agent container 50 to the controller 30. In the embodiment, data indicating a residual quantity state of urea water can be supplied, to the controller 30, from a urea water residual amount sensor 50*a*, as the reducing agent stored amount detector, in the urea water tank 50, as the reducing agent container.

Specifically, the urea water residual amount sensor 50*a* may be formed of a float in which a magnet is fixed; and a plurality of magnetically-driven reed switches, which can be disposed at different heights. Then, the urea water residual amount sensor 50*a* can detect a residual quantity state of the urea water by utilizing the fact that a reed switch corresponding to the position of the float that follows the liquid surface becomes a conductive state. More specifically, the urea water residual amount sensor 50*a* may include eight reed switches that can be arranged at equal intervals. With this configuration, the urea water residual amount sensor 50*a* can display the residual quantity state of the urea water on the image display device 40 in terms of eight levels. Here, a detection method of the reducing agent stored amount detector 50*a* may be properly selected depending on an operating environment, a freezing point of the reducing agent, and so forth, so that a detection method may be adopted such that a residual quantity state of the reducing agent can be continuously displayed.

Further, data indicating a stored amount of fuel can be supplied from a fuel stored amount detector 55*a* in the fuel container 55 to the controller 30. In the embodiment, data indicating a residual quantity state of fuel can be supplied, to the controller 30, from a fuel residual amount sensor 55*a*, as the fuel stored amount detector, in a fuel tank 55, as the fuel container.

Specifically, the fuel residual amount sensor 55*a* may be formed of a float that follows a liquid surface; and a variable resistor (a potentiometer) for converting a vertical variation amount of the float into a resistance value. With this configuration, the fuel residual amount sensor 55*a* can continuously display a residual quantity state of the fuel on the image display device 40. Here, a detection method of the fuel stored amount sensor 55*a* may be properly selected depending on an operating environment and so forth, so that a detection method may be adopted such that a residual quantity state of the fuel can be displayed stepwise.

Further, upon the operation levers 26A-26C being operated, the hydraulic pressure sensors 15*a* and 15*b* can detect pilot pressure that is conveyed to the control valve 17. Then, data indicating the detected pilot pressure can be supplied to the controller 30.

Further, in the embodiment, as shown in FIG. 5, the shovel may include an engine revolution speed adjustment dial 75 in the cabin 10. The engine revolution speed adjustment dial 75 can be a dial for adjusting a number of revolutions of the engine, and, in the embodiment, the number of revolutions of the engine can be switched into four steps. Additionally, data indicating a setting state of the number of revolutions of the engine can always be transmitted from the engine revolution speed adjustment dial 75 to the controller 30. Furthermore, the engine revolution speed adjustment dial 75 may allow the number of revolutions of the engine to be switched into four steps, which are a SP mode, an H mode, an A mode, and an idling mode. Note that FIG. 5 shows a state where the H mode is selected by the engine revolution speed adjustment dial 75.

The SP mode may be a revolution speed mode that can be selected if an amount of work is to be prioritized, and the largest number of revolutions of the engine can be used. The H mode may be a revolution speed mode that can be selected if both the amount of the work and fuel efficiency are to be achieved, and the second largest number of revolutions of the engine can be used. The A mode may be a revolution speed mode that can be selected if the shovel is to be operated with low noise while achieving fuel efficiency, and the third largest number of revolutions of the engine can be used. The idling mode may be a revolution speed mode that can be selected if the engine is to be transitioned to an idling mode, and the smallest number of revolution of the engine can be used. Then, the number of the revolution of the engine 11 can be maintained to be a constant number of revolutions of the engine that corresponds to the revolution speed mode selected by the engine revolution speed adjustment dial 75.

Figure 6:
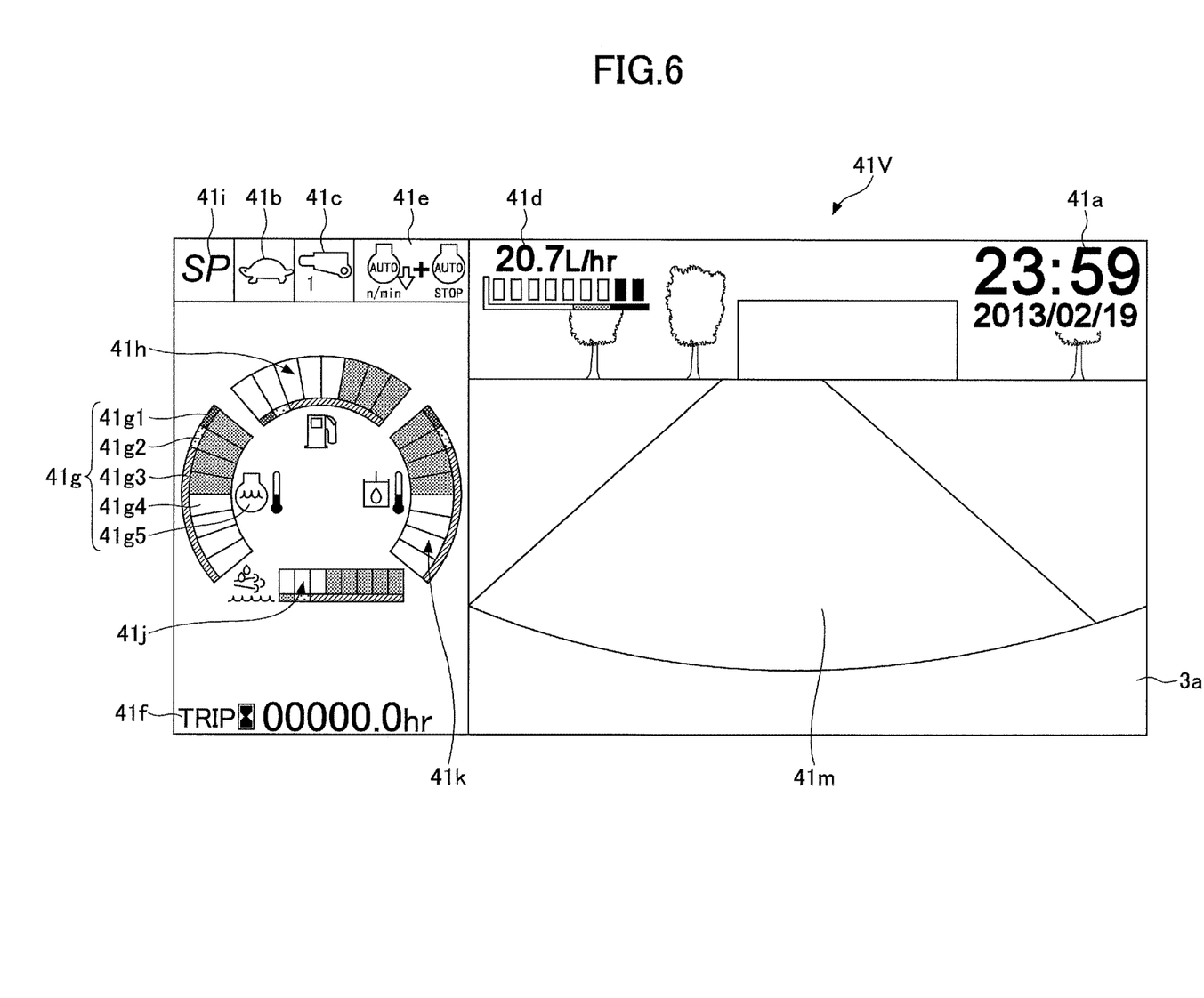
FIG. 6 is a diagram showing an example of a display screen that is displayed on the image display device.

Here, a display screen that is to be displayed on the image display unit 41 of the image display device 40 is described by referring to FIG. 6. Note that FIG. 6 is a diagram showing an example of the display screen.

As shown in FIG. 6, the display screen 41V may include a date and time display area 41a; a driving mode display area 41b; an attachment display area 41c; an average fuel consumption display area 41d; an engine control state display area 41e; an engine operating time display area 41f; a cooling water temperature display area 41g; a fuel residual quantity display area 41h; a revolution speed mode display area 41i; a urea water residual quantity display area 41j; a hydraulic oil temperature display area 41k; and a camera image display area 41m.

The date and time display area 41a can be an area for image-displaying the current date and time. In the example shown in FIG. 6, a digital display is adopted, and it is indicated that the date is Feb. 19, 2013, and the time is 23:59.

The driving mode display area 41b can be an area for image-displaying the current driving mode. The driving mode may represent a setting state of the traveling hydraulic motors that utilize the variable displacement hydraulic pump. Specifically, the driving mode may include a low-speed mode and a high-speed mode. The low-speed may be represented by a mark that imitates "a turtle," and the high-speed mode may be represented by a mark that imitates "a rabbit." In the example shown in FIG. 6, the mark that imitates the "turtle" is displayed, so that a driver can recognize that the low-speed mode is selected.

The attachment display area 41c can be an area for image-displaying an image that represents the currently installed attachment. The attachment that can be installed to the shovel may include various attachments, such as a bucket, a rock drill, a grapple, and a lifting magnet. The attachment display area 41c can display, for example, a mark that imitates the attachment, and a number corresponding to the attachment. In the example shown in FIG. 6, a mark that imitates the rock drill is displayed, and "1" is displayed as a number indicating a magnitude of the output of the rock drill.

The average fuel consumption display area 41d can be an area for image-displaying the current average fuel consumption. In the example shown in FIG. 6, a value in terms of a unit [L/hr (liters/hour)] and it's bar graph are displayed. Here, the average fuel consumption can be obtained based on an indicated value of a fuel injection amount that is to be transmitted from the controller 30 to the engine 11.

The engine control state display area 41e can be an area for image-displaying a control state of the engine 11. In the example shown in FIG. 6, a driver can recognize that "an automatic deceleration/automatic stop mode" is selected as a control state of the engine 11. Here, the "automatic deceleration/automatic stop mode" may mean a control state such that a number of revolutions of the engine is automatically decreased, and the engine 11 is to be automatically stopped, eventually, depending on duration of a state where a load to the engine is small. In addition, the control state of the engine 11 may include "an automatic deceleration mode," "an automatic stop mode," "a manual deceleration mode," and so forth.

The engine operating time display area 41f can be an area for image-displaying accumulated operation time of the engine 11. In the example shown in FIG. 6, a value in terms of a unit [hours] can be displayed.

The cooling water temperature display area 41g can be an area for image-displaying the current temperature state of the engine cooling water. In the example shown in FIG. 6, a bar graph is displayed that represents the temperature state of the engine cooling water. Note that the temperature of the engine cooling water may be based on data that is output by the water temperature sensor 11c that can be attached to the engine 11.

Specifically, the cooling water temperature display area 41g may include an abnormal range display 41g1; a warning range display 41g2; a normal range display 41g3; a segment display 41g4; and an icon display 41g5.

The abnormal range display 41g1, the warning range display 41g2, and the normal range display 41g3 can be displays for informing an operator that the temperature of the engine cooling water is in an abnormal high temperature state, a warning state, and a normal state, respectively. Further, the segment display 41g4 can be a display for informing an operator as to whether the temperature of the engine cooling water is high or low. Additionally, the icon display 41g5 can be an icon, such as a symbol figure, that may represent that the abnormal range display 41g1, the warning range display 41g2, the normal range display 41g3, and the segment display 41g4 are displays related to the temperature of the engine cooling water. Here, the icon display 41g5 can be text information that represents that the displays relates to the temperature of the engine cooling water.

In the example that is shown in FIG. 6, the segment display 41g4 may include eight segments whose light-on/light-off states can be individually controlled, and the number of the segments in the light-on state may increase, as the temperature of the cooling water increases. Note that, in the example of FIG. 6, four segments are in the light-on state.

In addition, the segment display 41g4 can form a part of a predetermined circle (an arc), and the segment display 41g4 can be displayed so that the length of the arc can be expanded in response to an increase or decrease of the temperature of the engine cooling water. Furthermore, in the example of FIG. 6, the widths of the temperature that are represented by the respective segments are the same; however, the widths of the temperature can be different for the respective segments.

Further, in the example shown in FIG. 6, the abnormal range display 41g1, the warning range display 41g2, and the normal range display 41g3 can be arc-shaped figures, respectively, that are arranged side by side along the expand direction (the circumferential direction of the predetermined circle) of the segment display 41g4; and the abnormal range display 41g1, the warning range display 41g2, and the normal range display 41g3 can always be lit in red color, yellow color, and green color, respectively. Additionally, in the segment display 41g4, the first (the lower most) to the sixth segments may belong to the normal range; the seventh segment may belong to the warning range; and the eighth (the upper most) segment may belong to the abnormal state.

Here, for the cooling water temperature display area 41g, characters, symbols and so forth that represent the abnormal level, the warning level, and the normal level, respectively, may be displayed at respective boundary portions, instead of displaying the abnormal range display 41g1, the warning range display 41g2, and the normal range display 41g3 by the arc-shaped figures.

Note that the above-described configuration including the abnormal range display, the warning range display, the normal range display, the segment display, and the icon display may be similarly adopted for the fuel residual quantity display area 41h, the urea water residual quantity display area 41j, and the hydraulic oil temperature display area 41k. Furthermore, for the fuel residual quantity display area 41h and the urea water residual quantity display area 41j, a character "F" or a black circle (a filled circle) that represents "Full (a full tank state)," a character "E" or a white circle (a circle that is not filled) that represents "Empty (an empty state)," and so forth can be displayed at the respective boundary portions, instead of displaying the arc-shaped figures that represent the abnormal range, the warning range, and the normal range.

The fuel residual quantity display area 41h can be an area for image-displaying a residual quantity state of the fuel that is stored in the fuel tank 55. In the example that is shown in FIG. 6, a bar graph that represents the current residual quantity state of the fuel is displayed. Note that the residual quantity of the fuel can be based on data that is output from the fuel residual amount sensor 55a.

The revolution speed mode display area 41i can be an area for image-displaying the current revolution speed mode. The revolution speed mode may include, for example, the above-described four modes, which are the SP mode, the H mode, the A mode, and the idling mode. In the example shown in FIG. 6, a symbol "SP" that represents the SP mode is displayed.

The urea water residual quantity display area 41j can be an area for image-displaying a residual quantity state of the urea water that is stored in the urea water tank 50. In the example that is shown in FIG. 6, a bar graph that represents the current residual quantity state of the urea water is displayed. Note that the residual quantity of the urea water can be based on data that is output from the urea water residual amount sensor 50a.

The hydraulic oil temperature display area 41k can be an area for image-displaying a temperature state of the hydraulic oil in a hydraulic oil tank. In the example that is shown in FIG. 6, a bar graph that represents the temperature state of the hydraulic oil is displayed. Note that the temperature of the hydraulic oil can be based on data that is output from the oil temperature sensor 14c.

Further, in the example that is shown in FIG. 6, the segment displays of the cooling water temperature display area 41g, the fuel residual quantity display area 41h, the urea water residual quantity display area 41j, and the hydraulic oil temperature display area 41k can be displayed in such a manner that these segment displays can expand along the circumferential direction of the same single predetermined circle. Specifically, the cooling water temperature display area 41g, the fuel residual quantity display area 41h, the urea water residual quantity display area 41j, and the hydraulic oil temperature display area 41k can be arranged at a left side portion, an upper side portion, a lower side portion, and a right side portion of the predetermined circle, respectively. Additionally, in each of the cooling water temperature display area 41g and the hydraulic oil temperature area 41k, the abnormal range display, the warning range display, and the normal range display are arranged in this order from the top; and in each of the fuel residual quantity display area 41h and the urea water residual quantity display area 41j, the abnormal range display, the warning range display, and the normal range display are arranged in this order from the left. Furthermore, in each of the fuel residual quantity display area 41h and the urea water residual quantity display area 41j, the segment display can be displayed in such a manner that the number of the segments in the light-on state increases, as the residual quantity increases; the first segment (the right end) to the sixth segment belong to the normal range, the seventh segment belongs to the warning range, and the eighth segment (the left end) belongs to the abnormal range.

In addition, for each of the cooling water temperature display area 41g, the fuel residual quantity display area 41h, the urea water residual quantity display area 41j, and the hydraulic oil temperature display area 41k, a needle display may be adopted, instead of the bar graph display.

The camera image display area 41m can be an area for image-displaying a camera image. In the embodiment, the shovel may include the image capturing device 80 (cf. FIGS. 3-5) for capturing an image of a portion other than the driver's view. Specifically, the image capturing device 80 may include the rear monitoring camera 80B (cf. FIGS. 3 and 4) for capturing an image in a direction (backward) that is opposite to the direction in which the cabin 10 is directed. Then, the image capturing device 80 may transmit the captured camera image to the conversion processing unit 40a of the image display device 40. In this manner, a driver can visually confirm the camera image that is captured by the image capturing device 80 on the image display unit 41 of the image display device 40.

In the embodiment, while the shovel is operated, the camera image display area 41m may always display the camera image that is captured by the rear monitoring camera 80B. That is to allow a driver to monitor behind the shovel without relying on a rear-view mirror. In this case, the rear-view mirror may be omitted.

Further, in the embodiment, the camera image display area 41m may occupy approximately two-thirds of the area of the display screen 41V at the right side. That is to enhance the overall visibility by displaying the fuel residual quantity display area 41h, the urea water residual quantity display area 41*j*, and so forth at the side that is close to the driver's seat (the driver), and by displaying the camera image display area 41*m* at the side that is separated from the driver's seat (the driver), in the environment where the image display device 40 is installed in the front right side of the driver's seat. However, the sizes and the arrangement of the display areas in the display screen 41V may be modified depending on necessity.

Additionally, in the display screen 41V, a part of the above-described display areas 41*a*-41*k* may be omitted, and the display screen 41V may include a display area other than the above-described display areas. For example, the display screen 41V may include an exhaust gas filter state display area for displaying a clogging condition of an exhaust gas filter (e.g., a diesel particulate removing device (Diesel Particulate Filter (DPF))). Specifically, a bar graph representing a ratio of the current operating time with respect to the allowable maximum operating time of the exhaust filter may be displayed in the exhaust gas filter state display area. Furthermore, in the display screen 41V, the display of the temperature state of the hydraulic oil may be omitted; and the display of the temperature state of the hydraulic oil and the display of the temperature state of the cooling water may be omitted.

Further, the lower portion of the camera image display area 41*m* may include an upper edge of the rear end of the cover 3*a* of the upper turning body 3. In this manner, the image display device 40 may allow a driver to more easily recognize a sense of a distance between an object that can be displayed in the camera image display area 41*m* and the shovel.

Figure 7:
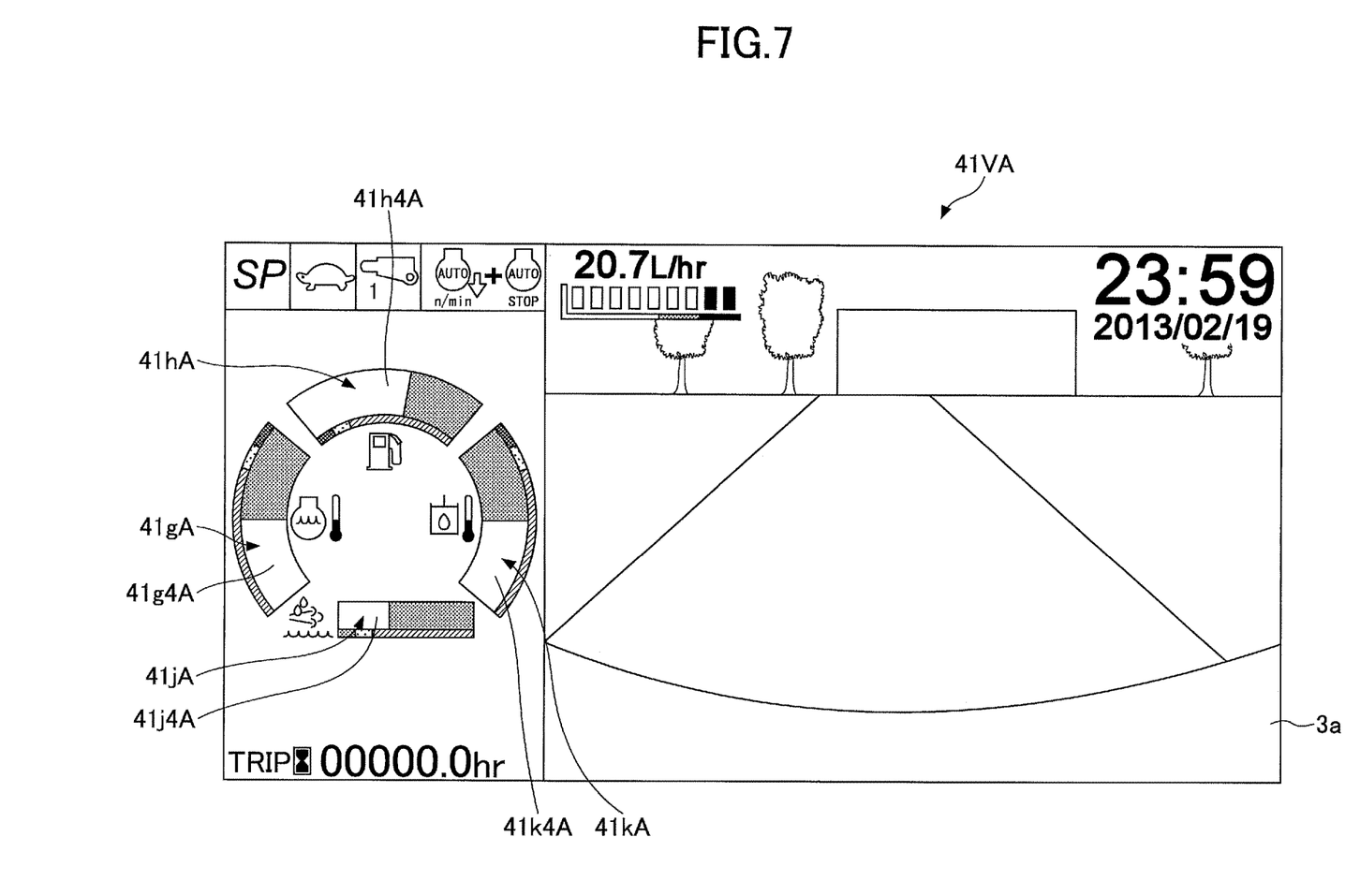
FIG. 7 is a diagram showing another example of the display screen.

Next, another example of the display screen that is displayed on the image display unit 41 of the image display device 40 is described by referring to FIG. 7. Here, FIG. 7 is a diagram showing a display screen 41VA. Additionally, the display screen 41VA of FIG. 7 may correspond to the display screen 41V of FIG. 6. For this reason, the reference numerals that represent components of the display screen 41VA of FIG. 7 are indicated by attaching "A" to the ends of the reference numerals that represent corresponding components of the display screen 41V of FIG. 6.

As shown in FIG. 7, the display screen 41VA may be different from the display screen 41V of FIG. 6 in a point that a bar graph display is adopted that can expand almost continuously, instead of the bar graph display that can expand stepwise, for the cooling water temperature display area 41*g*A, the fuel residual quantity display area 41*h*A, the urea water residual quantity display area 41*j*A, and the hydraulic oil temperature display area 41*k*A.

Specifically, for the display screen 41VA, a bar graph display can be adopted that can be formed of a great number of steps that may not be distinguished by unaided eyes, instead of the bar graph display that can be formed of a relatively small number of segments, such as about eight steps that can be adopted for the display screen 41V of FIG. 6.

Figure 8:
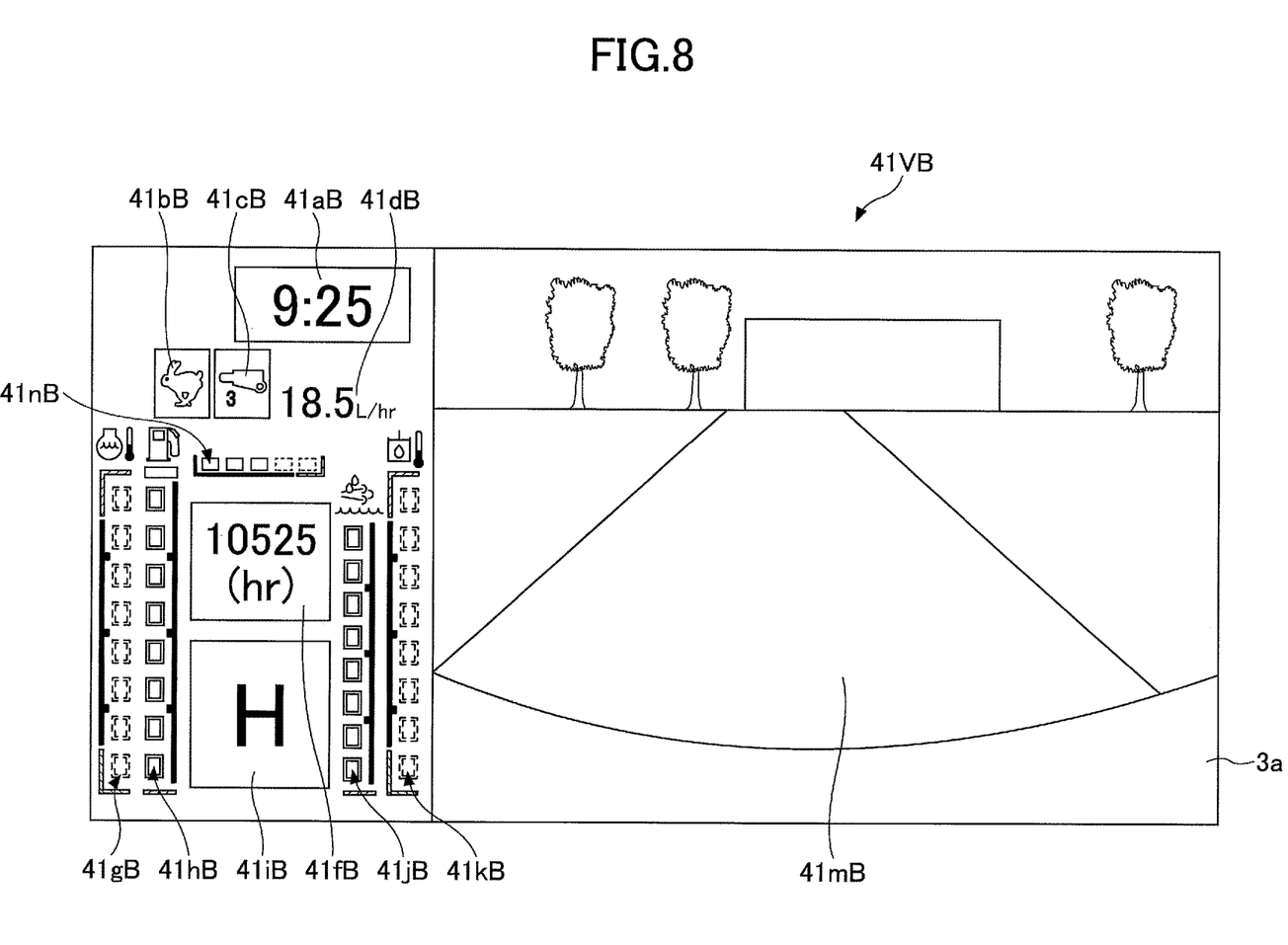
FIG. 8 is a diagram showing still another example of the display screen.

Next, still another example of the display screen that is to be displayed on the image display unit 41 of the image display device 40 is described by referring to FIG. 8. Here, FIG. 8 is a diagram showing a display screen 41VB Additionally, the display screen 41VB of FIG. 8 may correspond to the display screen 41V of FIG. 6. For this reason, the reference numerals that represent components of the display screen 41VB of FIG. 8 are indicated by attaching "B" to the ends of the reference numerals that represent corresponding components of the display screen 41V of FIG. 6.

As shown in FIG. 8, the display screen 41VB may be different from the display screen 41V of FIG. 6 in the arrangement of the display areas. Specifically, the display screen 41VB may be different from the display screen 41V of FIG. 6 in a point that the engine control state display area 41*e* is omitted, and that the exhaust gas filter state display area 41*n*B is added.

The exhaust gas filter state display area 41*n*B can be an area for image-displaying a current state of the exhaust filter. In the example that is shown in FIG. 8, a bar graph is displayed that represents a ratio of the current operating time with respect to the allowable maximum operating time of the exhaust filter. In this case, the exhaust gas filter may be arranged at the engine side relative to the urea water injector. In addition, a pressure difference between an inlet side and an outlet side of the exhaust gas filter can be input to the controller 30 through the engine control unit (ECU) 74. Then, the controller 30 can transmit, together with data indicating the residual amount of the urea water and so forth, data indicating the pressure difference to the conversion processing unit 40*a*. The conversion processing unit 40*a* can convert the received data indicating the pressure difference into an image signal, and the conversion processing unit 40*a* can cause the corresponding image to be displayed on the image display unit 41.

Further, the display screen 41VB may be different from the display screen 41V of FIG. 6 in a point that the segment displays of the cooling water temperature display area 41*g*B, the fuel residual quantity display area 41*h*B, the urea water residual quantity display area 41*j*B, and the hydraulic oil temperature display area 41*k*B can expand along the vertical direction of the figure, instead of the circumferential direction of the predetermined circle.

Figure 9:
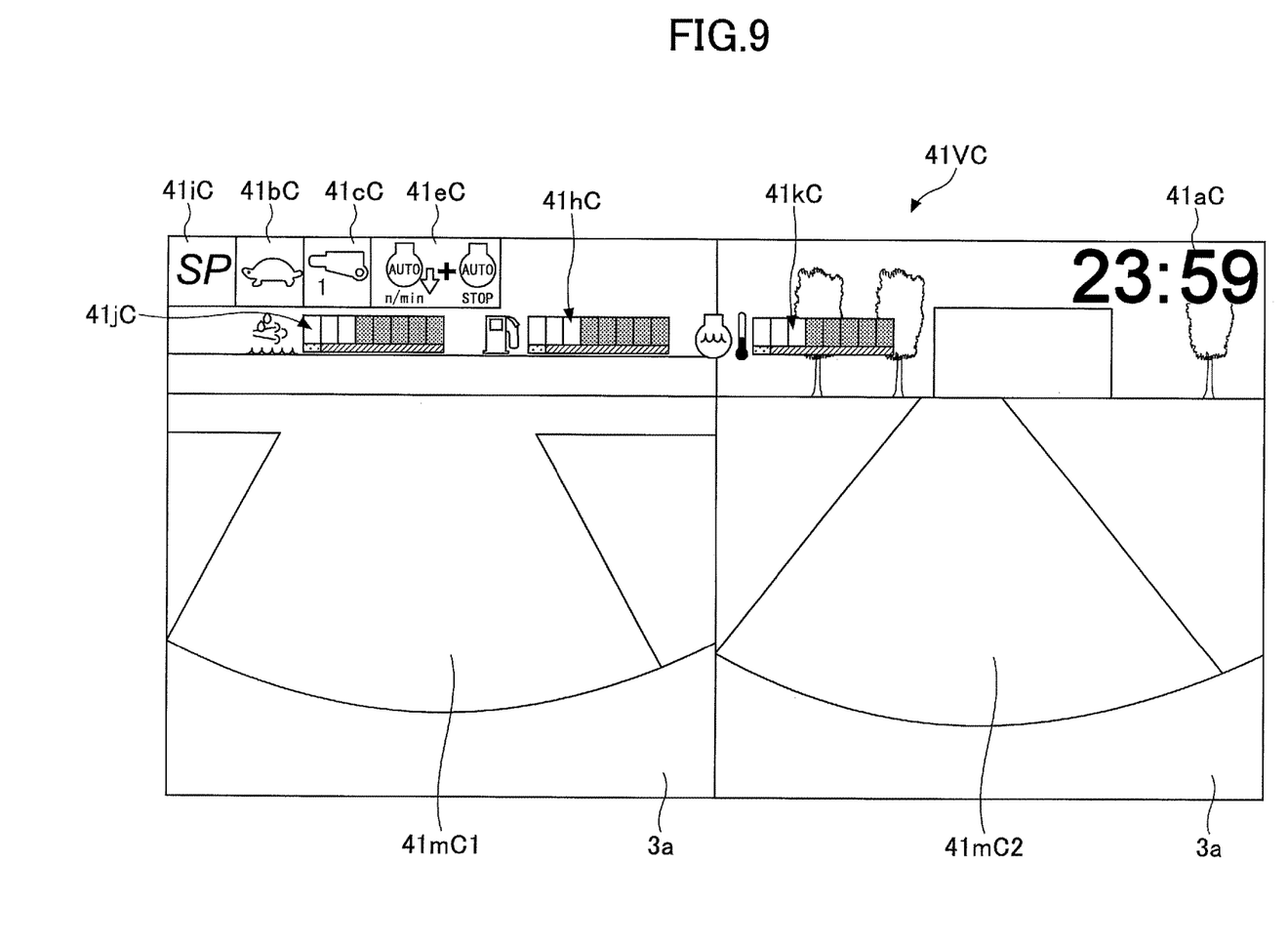
FIG. 9 is a diagram showing still another example of the display screen.

Next, still another example of the display screen that is to be displayed on the image display unit 41 of the image display device 40 is described by referring to FIG. 9. Here, FIG. 9 is a diagram showing a display screen 41VC. Additionally, the display screen 41VC of FIG. 9 may correspond to the display screen 41V of FIG. 6. For this reason, the reference numerals that represent components of the display screen 41VC of FIG. 9 are indicated by attaching "C" to the ends of the reference numerals that represent corresponding components of the display screen 41V of FIG. 6.

As shown in FIG. 9, the display screen 41VC may be different from the display screen 41V of FIG. 6 in a point that the camera image display area 41*m*C1 is arranged at the left half, and that the camera image display area 41*m*C2 is arranged at the right half.

While the shovel is operated, the camera image display area 41*m*C1 may always display a camera image that is captured by the rear monitoring camera 80B. Additionally, while the shovel is operated, the camera image display area 41*m*C2 may always display a camera image that is captured by the right side monitoring camera 80R (cf. FIGS. 3 and 4). Here, on the display screen 41VC, a camera image that is captured by the rear monitoring camera 80B may be displayed at the right half, and a camera image that is captured by the left side monitoring camera 80L (cf. FIGS. 3 and 4) may be displayed at the left half. Alternatively, on the display screen 41VC, camera images that are captured by three or more cameras, respectively, may be displayed. In this case, on the display screen 41VC, a camera image that is captured by the left side monitoring camera 80L may be displayed at one third at the left side, a camera image that is captured by the rear monitoring camera 80B may be displayed at one third at the center, and a camera image that is captured by the right side monitoring camera 80R may be displayed at one third at the right side. Additionally or alternatively, on the display screen 41VC, a synthesized image may be displayed, such as a view point conversion image that can be created by synthesizing a plurality of camera images that may be captured by a plurality of cameras and a bird's view image.

Additionally, on the display screen 41VC, the other display areas 41aC-41kC may be arranged at the upper edge portion thereof; and the segment displays in the fuel residual quantity display area 41hC, the urea water residual quantity display area 41jC, and the hydraulic oil temperature display area 41kC may be arranged to expand along the horizontal direction in the figure. Note that, in the display screen 41VC, the average fuel consumption display area, the engine operating time display area, and the cooling water temperature display area are omitted.

Further, the lower portions of the camera image display areas 41mC1 and 41mC2 may include the upper edge of the rear end of the cover 3a and the upper edge of the right end of the cover 3a of the upper turning body 3, respectively. In this manner, the image display device 40 may allow a driver to more easily recognize a sense of distances between objects that can be displayed in the camera image display areas 41mC1 and 41mC2 and the shovel. It may be the same for a case where a camera image that is captured by the left side monitoring camera 80L is to be displayed in the camera image display area.

By displaying a residual quantity state of urea water by the above-described configuration, the image display device 40 according to the above-described embodiment may allow a driver in the cabin 10 to confirm the residual quantity state of the urea water.

Further, by simultaneously displaying the residual quantity state of the urea water and the residual quantity state of the fuel, the image display device 40 may allow the driver in the cabin 10 to simultaneously confirm the residual quantity state of the urea water and the residual quantity state of the fuel.

Further, by displaying the residual quantity state of the urea water together with the camera image that is captured by the image capturing device 80, the image display device 40 may allow the driver in the cabin 10 to confirm the residual quantity state of the urea water, while the driver is monitoring a blind area. Especially, by displaying the residual quantity state of the urea water together with the camera image that is captured by the rear monitoring camera 80B, the image display device 40 may allow the driver in the cabin 10 to confirm the residual quantity state of the urea water, while the driver is monitoring behind.

Further, by displaying the residual quantity state of the urea water together with the temperature state of the cooling water of the engine 11, the image display device 40 may allow the driver in the cabin 10 to confirm the residual quantity state of the urea water together with the temperature state of the cooling water.

Further, by displaying the residual quantity state of the urea water together with the temperature state of the hydraulic oil, the image display device 40 may allow the driver in the cabin 10 to confirm the residual quantity state of the urea water together with the temperature state of the hydraulic oil.

Further, by displaying the residual quantity state of the urea water by the bar graph, the image display device 40 may allow the driver in the cabin 10 to more intuitively find the residual quantity state of the urea water.

Further, in the example of FIG. 9, the image display device 40 may image-display the camera image of the rear monitoring camera 80B at the left side of the horizontally elongated display screen 41VC, and the image display device 40 may image-display the camera image of the right side monitoring camera 80R at the right side thereof. However, the present invention is not limited to this configuration. For example, the image display device 40 may display only the camera image of the rear monitoring camera 80B in the entire area of the camera image display area, which is obtained by combining the two camera image display areas 41mC1 and 41rC2. In this case, the image display device 40 may also image-display the residual quantity state of the fuel and the residual quantity state of the urea water at the upper side of the display screen 41VC, and the image display device 40 may image-display the camera image that is captured by the rear monitoring camera 80B at the lower side of the display screen 41VC. Additionally, in this case, by using the horizontally elongated display screen, the image display device 40 may enhance visibility of the segment displays of the fuel residual, quantity display area 41hC, the urea water residual quantity display area 41jC, and the hydraulic oil temperature display area 41kC.

Further, the image display device 40 according to the above-described embodiment may display a plurality of bar graphs including the bar graph that represents the residual quantity state of the urea water, and the bar graph that represents the residual quantity state of the fuel in such a manner that these bar graphs may form parts of the same single circle. Thus, the image display device 40 may arrange the plurality of the bar graphs within a narrow display range in a simplified manner. As a consequence, even if the range of the display is limited so that the display can be accommodated within the width of the frame (the pillar) 10a, the image display device 40 can present, to the driver, the residual quantity state of the urea water together with the residual quantity state of the fuel in a simplified manner.

Further, the image display device 40 may arrange the bar graphs that represent the temperature states of the cooling water and the hydraulic oil, which tend to approach the abnormal range as the temperature increases, at the left portion and the right portion of the same single circle, respectively. Namely, the bar graphs can be arranged so that they can be extended upward, and they can be shrunk downward. Thus, the image display device 40 may allow a driver to intuitively recognize that, as the degree of the extension in any of the two bar graphs becomes greater, it becomes closer to the abnormal range.

Further, the image display device 40 may arrange the bar graphs that represent the residual quantity states of the urea water and the fuel, which tend to approach the abnormal range as the residual quantity becomes small, at the upper portion and the lower portion of the same single circle, respectively. Namely, the bar graphs can be arranged so that they can be extended to the right, and they can be shrunk to the left; or so that they can be extended to the left, and they can be shrunk to the right. Thus, the image display device 40 may allow a driver to intuitively recognize that, as the degree of the extension of the bar graph of any the two bar graphs becomes smaller (as it becomes closer to the left end or to the right end), it becomes closer to the abnormal range.

Further, in the above-described embodiment, the examples of the display screen of the image display device 40 that can be installed in the shovel are shown; however, the present invention is not limited to this. For example, the display screen that is to be displayed on the image display device 40 can be displayed on a control device that can execute radio communication with the shovel.

The present invention is not limited to the specifically disclosed embodiments using the above-mentioned shovel as an example, and various variations and modifications may be made without departing from the scope of the present invention.

For example, in the above-described embodiment, the image display device 40 can always display the bars (the extending and shrinking portions) of the bar graphs in the same color; however, the colors of the extending and shrinking portions may be varied depending on the levels of the states, which are attempted to be represented by the corresponding bar graphs. For example, upon detecting that the level belongs to the normal range, the image display device 40 may display the extending and shrinking portion in green color; upon detecting that the level belongs to the warning range, the image display device 40 may display the extending and shrinking portion in yellow color; and upon detecting that the level belongs to the abnormal range, the image display device 40 may display the extending and shrinking portion in red color. Alternatively or additionally, upon detecting that the level, which is to be represented by each of the bar graphs, belongs to the abnormal range, the image display device 40 may cause the extending and shrinking portion or the entire bar graph to be blinked.

What is claimed is:

1. A shovel that performs works upon being operated by a driver, the shovel comprising:
    a lower traveling body;
    an upper turning body that is installed on the lower traveling body;
    an internal-combustion engine that is disposed in the upper turning body;
    an oil hydraulic pump that discharges hydraulic oil by power of the internal-combustion engine;
    a hydraulic actuator that is driven by the hydraulic oil that is discharged by the oil hydraulic pump;
    a fuel container that stores fuel of the internal-combustion engine;
    a reducing agent container that stores a reducing agent that is to be used in a selective catalytic reduction system;
    a display device that is installed in a cabin of the shovel;
    a processor; and
    a memory,
    wherein the processor detects a residual quantity state of the fuel in the fuel container,
    wherein the processor detects a residual quantity state of the reducing agent in the reducing agent container,
    wherein the processor causes, while the shovel is operated, the display device to simultaneously image-display an image that is captured by a rear monitoring camera, a setting state of the shovel set by the driver, the setting state including a revolution speed mode of the internal-combustion engine, the residual quantity state of the fuel, the residual quantity state of the fuel indicating one of driving conditions of the shovel, and the residual quantity state of the reducing agent, the residual quantity state of the reducing agent indicating another one of the driving conditions of the shovel, and
    wherein, based on the detected residual quantity state of the reducing agent, the processor causes the display device to image-display the residual quantity state of the reducing agent such that a normal range display is included in an image of the residual quantity state of the reducing agent, so that a deviation from a normal range of a residual quantity of the reducing agent can be visually recognized.

2. The shovel according to claim 1, wherein the processor causes the display device to image-display the residual quantity state of the fuel and the residual quantity state of the reducing agent at a side that is close to a driver's seat in a display area, and
    wherein the processor causes the display device to image display the image that is captured by the rear monitoring camera at a side that is distant from the driver's seat in the display area.

3. The shovel according to claim 1, wherein the processor detects a temperature of a coolant of a cooling circuit in the internal-combustion engine,
    wherein the processor causes the display device to image-display a temperature state of the coolant, together with the residual quantity state of the fuel and the residual quantity state of the reducing agent.

4. The shovel according to claim 1, wherein the processor detects a temperature of a hydraulic oil for driving an attachment,
    wherein the processor causes the display device to simultaneously image-display a temperature state of the hydraulic oil, and the residual quantity state of the fuel and the residual quantity state of the reducing agent.

5. The shovel according to claim 1, wherein the processor causes the display device to simultaneously image-display accumulated operation time of the shovel, and the residual quantity state of the fuel and the residual quantity state of the reducing agent.

6. The shovel according to claim 1, wherein the processor causes the display device to image-display the residual quantity state of the fuel and the residual quantity state of the reducing agent by bar graphs.

7. The shovel according to claim 6, wherein the bar graphs form parts of a predetermined circle.

8. The shovel according to claim 1,
    wherein processor causes the display device to image-display the residual quantity state of the fuel and the residual quantity state of the reducing agent at an upper side in a display area, and
    wherein the processor causes the display to image-display the image that is captured by the rear monitoring camera at a lower side in the display area.

9. The shovel according to claim 1, wherein the processor causes the display device to image-display a clogging condition of a diesel particulate filter.

10. The shovel according to claim 1, further comprising:
    a controller that determines abnormality based on the residual quantity state of the reducing agent detected by the processor,
    wherein the controller automatically changes a control state of the internal-combustion engine.

11. The shovel according to claim 1, wherein, in response to detecting that the image captured by the rear monitoring camera is superposed with the image of the residual quantity state of the reducing agent, the processor causes the display device to to display the image of the residual quantity state of the reducing agent in front of the image captured by the rear monitoring camera.

12. The shovel according to claim 1, further comprising:
    a controller that receives data representing the residual quantity state of the reducing agent detected by the processor; and
    an engine control unit that automatically changes a control state of the internal-combustion engine.

13. The shovel according to claim 12, wherein the engine control unit receives data representing the residual quantity state of the fuel detected by the processor.

\* \* \* \* \*